United States Patent
Bihong

(10) Patent No.: US 10,982,826 B2
(45) Date of Patent: Apr. 20, 2021

(54) LIGHTED EGG APPARATUS

(71) Applicant: Ningbo QTOP Import & Export Co., Ltd., Ningbo (CN)

(72) Inventor: Shen Bihong, Ningbo (CN)

(73) Assignee: Ningbo QTOP Import & Export Co., Ltd., Ningbo (CN)

( * ) Notice: Subject to any disclaimer, the term of this patent is extended or adjusted under 35 U.S.C. 154(b) by 0 days.

(21) Appl. No.: 16/420,835

(22) Filed: May 23, 2019

(65) Prior Publication Data

US 2020/0370716 A1    Nov. 26, 2020

(51) Int. Cl.
| | |
|---|---|
| F21L 4/00 | (2006.01) |
| B65D 85/60 | (2006.01) |
| B65D 5/50 | (2006.01) |
| A47G 33/00 | (2006.01) |
| F21W 121/00 | (2006.01) |
| F21Y 115/10 | (2016.01) |
| H04W 76/10 | (2018.01) |

(52) U.S. Cl.
CPC ............... *F21L 4/00* (2013.01); *A47G 33/00* (2013.01); *B65D 5/5011* (2013.01); *B65D 85/60* (2013.01); *F21W 2121/00* (2013.01); *F21Y 2115/10* (2016.08); *H04W 76/10* (2018.02)

(58) Field of Classification Search
CPC ..... F21Y 2115/10; F21L 4/00; F21L 2001/00; F21L 2005/00; F21W 2121/00; A47G 33/00; B65D 5/5011; B65D 85/60; H04W 76/10; F21V 23/0435; F21V 19/0055
See application file for complete search history.

(56) References Cited

U.S. PATENT DOCUMENTS

| | | | | | |
|---|---|---|---|---|---|
| 2,815,439 | A | * | 12/1957 | Plubell | B44C 5/06 40/540 |
| 3,588,490 | A | * | 6/1971 | Nicholl | F21L 2/00 362/184 |
| 4,985,813 | A | * | 1/1991 | Putman | F21L 4/00 340/321 |
| 5,545,069 | A | * | 8/1996 | Glynn | A23G 3/28 362/253 |
| 6,231,346 | B1 | * | 5/2001 | Sagi-Dolev | G09B 19/00 434/225 |
| 2001/0032655 | A1 | * | 10/2001 | Gindi | A45C 15/00 132/293 |

(Continued)

OTHER PUBLICATIONS

"Illuminated Easter Egg Hunt" Play At Home Mom LLC, accessed at http://www.playathomemomllc.com/2012/03/illuminated-easter-egg-hunt/ on Nov. 25, 2020 (Year: 2012).*

(Continued)

*Primary Examiner* — Erin Kryukova
(74) *Attorney, Agent, or Firm* — The Watson IP Group, PLC; Jovan N. Jovanovic

(57) ABSTRACT

A device is comprised of an egg-shaped housing and a lighting module. The egg-shaped housing is comprised of an inside surface and an outside surface. The lighting module is coupled to the egg-shaped housing and is comprised of a light emitting diode, a battery to power the light emitting diode, and a switch to control whether power from the battery is applied to the light emitting diode. The light emitting diode generates light that shines on the inside surface of the egg-shaped housing, the light being visible outside the egg-shaped housing.

20 Claims, 7 Drawing Sheets

(56) References Cited

U.S. PATENT DOCUMENTS

| | | | | |
|---|---|---|---|---|
| 2002/0089845 | A1* | 7/2002 | Altman | F21L 4/005 362/116 |
| 2003/0210555 | A1* | 11/2003 | Cicero | B44C 5/005 362/555 |
| 2007/0091633 | A1* | 4/2007 | Harrity | F21S 6/001 362/551 |
| 2008/0283539 | A1* | 11/2008 | Salice | B65D 43/162 220/838 |
| 2013/0223043 | A1* | 8/2013 | Ray | F21V 33/00 362/96 |
| 2015/0198296 | A1* | 7/2015 | Del Rosario | A63H 3/003 510/138 |
| 2016/0010844 | A1* | 1/2016 | Ma | A45C 15/06 362/154 |
| 2016/0169463 | A1* | 6/2016 | Gunderson | F21S 6/00 362/157 |
| 2017/0307965 | A1* | 10/2017 | Sum | G03B 21/10 |
| 2018/0010750 | A1* | 1/2018 | Cheng | G02B 6/0006 |
| 2018/0306396 | A1* | 10/2018 | Patton | F21K 9/235 |
| 2018/0306424 | A1* | 10/2018 | Van De Sluis | F21V 23/0414 |

OTHER PUBLICATIONS

"Amazon.com Light Up Easter Egg With Color Changing LED", Amazon.com, accessed at https://www.amazon.com/Light-Easter-Egg-Color-Changing/dp/B01BKV7Q0E?ref_=ast_sto_dp on Nov. 25, 2020 (Year: 2016).*

* cited by examiner

LIGHTED EGG APPARATUS

BACKGROUND OF THE DISCLOSURE

1. Field of the Disclosure

The disclosure relates in general to an Easter egg for holding candy or the like, and more particularly, to an Easter egg light emitting diode (LED), to form a lighted egg.

2. Background Art

Easter is a Christian holiday commemorating the resurrection of Jesus from the dead. This resurrection is described in the New Testament as occurring on the third day after his burial following his crucifixion by the Romans at Calvary c. 30 AD. It is the culmination of the Passion of Jesus, preceded by Lent (or Great Lent), a 40-day period of fasting, prayer, and penance. Easter is also called Pascha or Resurrection Sunday.

One of the traditions surrounding Easter is the Easter egg hunt. The Easter egg hunt entails adults, typically parents, hiding eggs for children either outdoors or indoors. These eggs are typically hollow plastic eggs that are filled with candy, making the Easter egg hunt an enjoyable event for children.

SUMMARY OF THE DISCLOSURE

The disclosure is directed to a device comprised of an egg-shaped housing and a lighting module. The egg-shaped housing is comprised of an inside surface and an outside surface. The lighting module is coupled to the egg-shaped housing and is comprised of a light emitting diode, a battery to power the light emitting diode, and a switch to control whether power from the battery is applied to the light emitting diode. The light emitting diode generates light that shines on the inside surface of the egg-shaped housing, the light being visible outside the egg-shaped housing.

In some configurations, the egg-shaped housing includes a first portion and a second portion, the first portion and the second portion coupling together to form the egg-shaped housing.

In some configurations, the egg-shaped housing further includes a coupler to couple the first portion and the second portion.

In some configurations, the lighting module is coupled to the egg-shaped housing via a screw.

In some configurations, the egg-shaped housing is constructed from at least one of Polyethylene Terephthalate (PET), High-Density Polyethylene (HDPE), Polyvinyl Chloride (PVC), Low-Density Polyethylene (LDPE), Polypropylene (PP), Polystyrene or Styrofoam (PS), polycarbonate, polylactide, acrylic, acrylonitrile butadiene, styrene, fiberglass, and nylon.

In some configurations, a system includes the device and the egg-shaped housing is a first egg-shaped housing, the inside surface is a first inside surface, and the outside surface is a first outside surface, the lighting module is a first lighting module, the light emitting diode is a first light emitting diode, the battery is a first battery, and the switch is a first switch. The first lighting module is further comprised of a first wireless receiver. The system includes a wireless transmitter and a second device comprised of a second egg-shaped housing and a second lighting module coupled to the second egg-shaped housing and comprised of a second light emitting diode, a second battery to power the second light emitting diode, a second switch, and a second wireless receiver, the second light emitting diode generating light that shines on the second inside surface of the second egg-shaped housing, the light being visible on the second outside surface of the second egg-shaped housing. The transmitter transmits a wireless control signal to the first and second switches to control, based on the wireless control signal, whether power from the first and second batteries is applied to the first and second light emitting diodes, respectively.

In some configurations, the switch is a slide switch.

In some configurations, the switch is a wireless switch.

In some configurations, the light emitting diode is a multicolor light emitting diode.

In some configurations, the lighting module is further comprised of a controller to control a state of the light emitting diode.

In some configurations, the state of the light emitting diode includes a periodic color change of the light emitting diode.

In some configurations, the state of the light emitting diode includes a random color change of the light emitting diode.

In some configurations, the state of the light emitting diode includes a periodic change from an ON and OFF state of the light emitting diode.

In some configurations, the device according to claim 1, further comprising a hanger, coupled to the egg-shaped housing, to hang the device from an object.

In some configurations, the lighting module includes a flat surface that allows the egg-shaped housing to stand up on a surface along a long axis of the egg-shaped housing.

In some configurations, the egg-shaped housing further includes a lighting module cover to cover the lighting module, the lighting module cover shaped in an arc that together with the egg-shaped housing forms a complete egg shape surrounding the lighting module.

In some configurations, the device further includes a coupler to couple the lighting module cover to the egg-shaped housing.

BRIEF DESCRIPTION OF THE DRAWINGS

The disclosure will now be described with reference to the drawings wherein.

DETAILED DESCRIPTION OF THE DISCLOSURE

Figure 1:
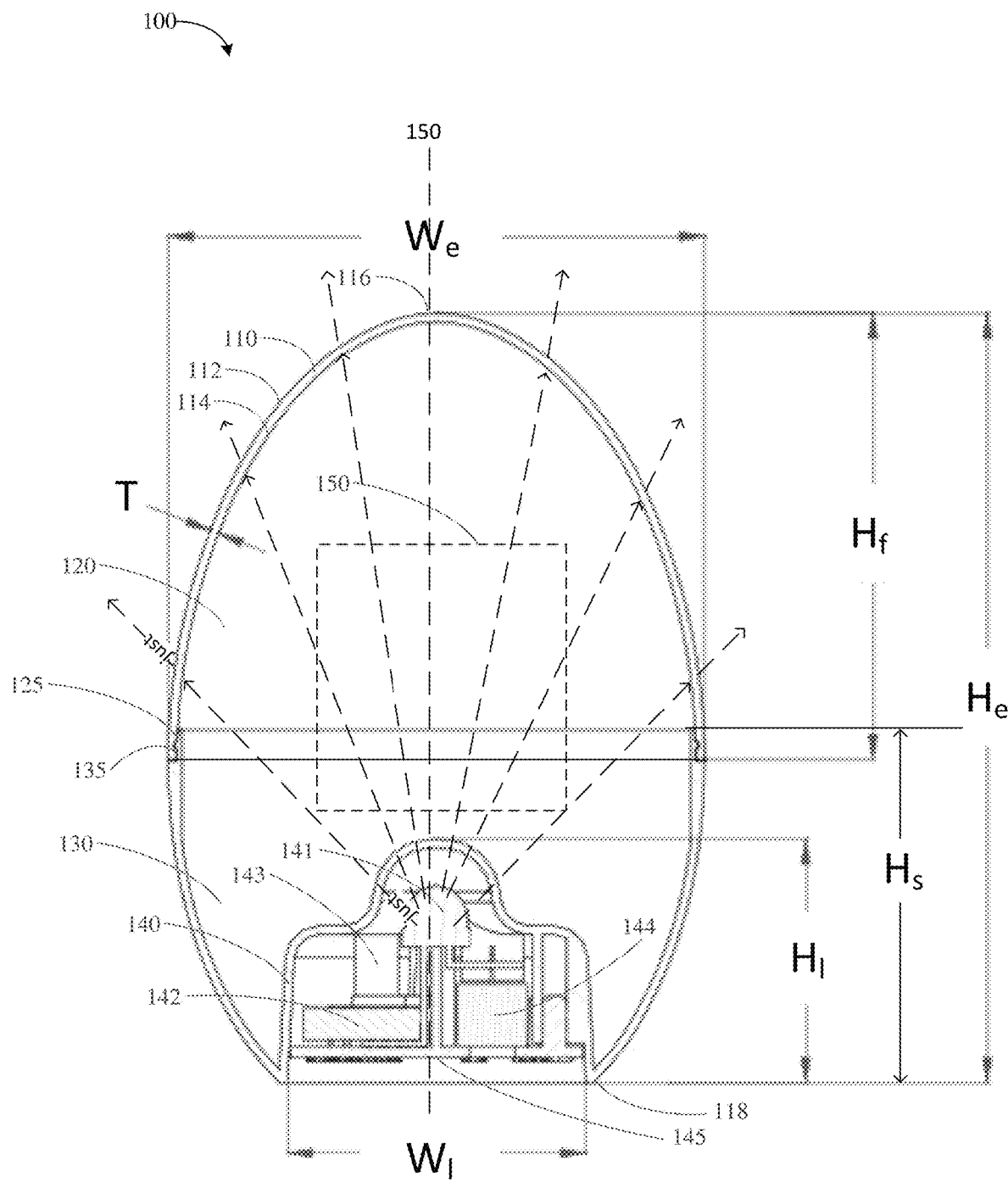
FIG. 1 of the drawings illustrates a cross-sectional view of an egg-shaped device of the present disclosure.
Figure 2:
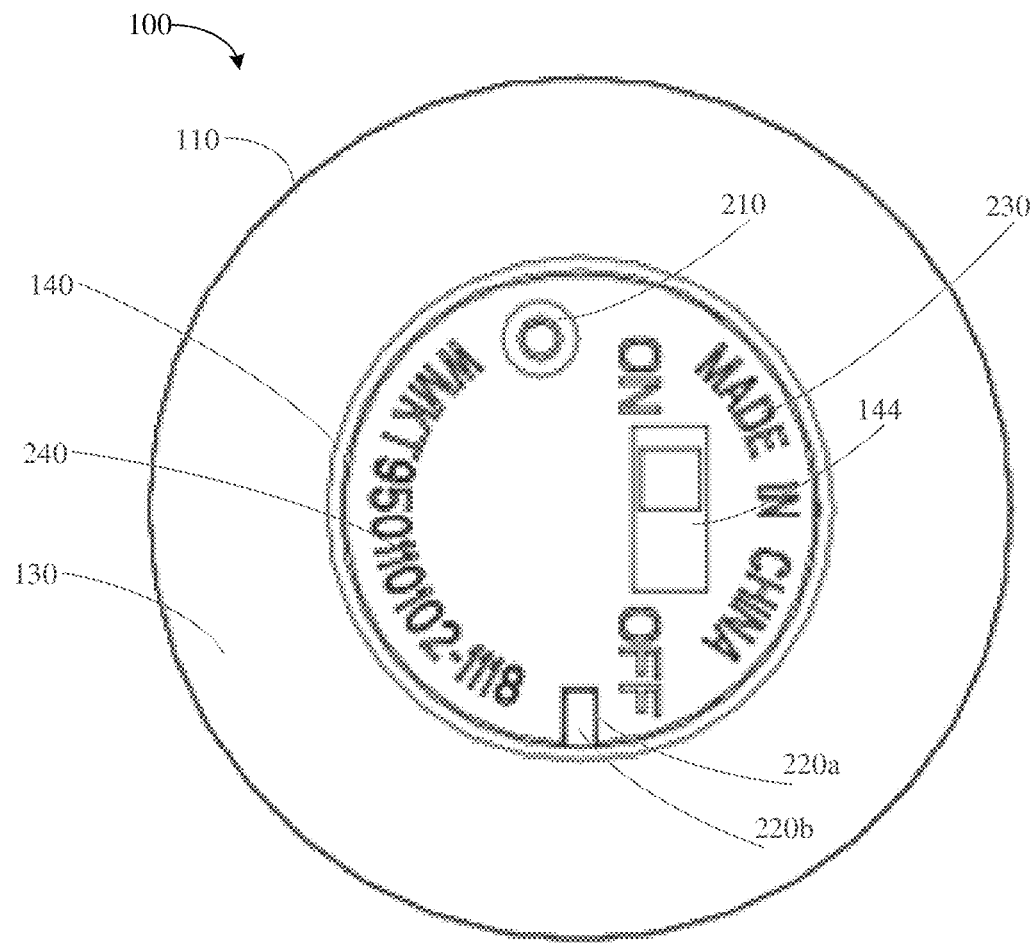
FIG. 2 of the drawings illustrates bottom view of the egg-shaped device shown in FIG. 1 of the present disclosure.
Figure 3:
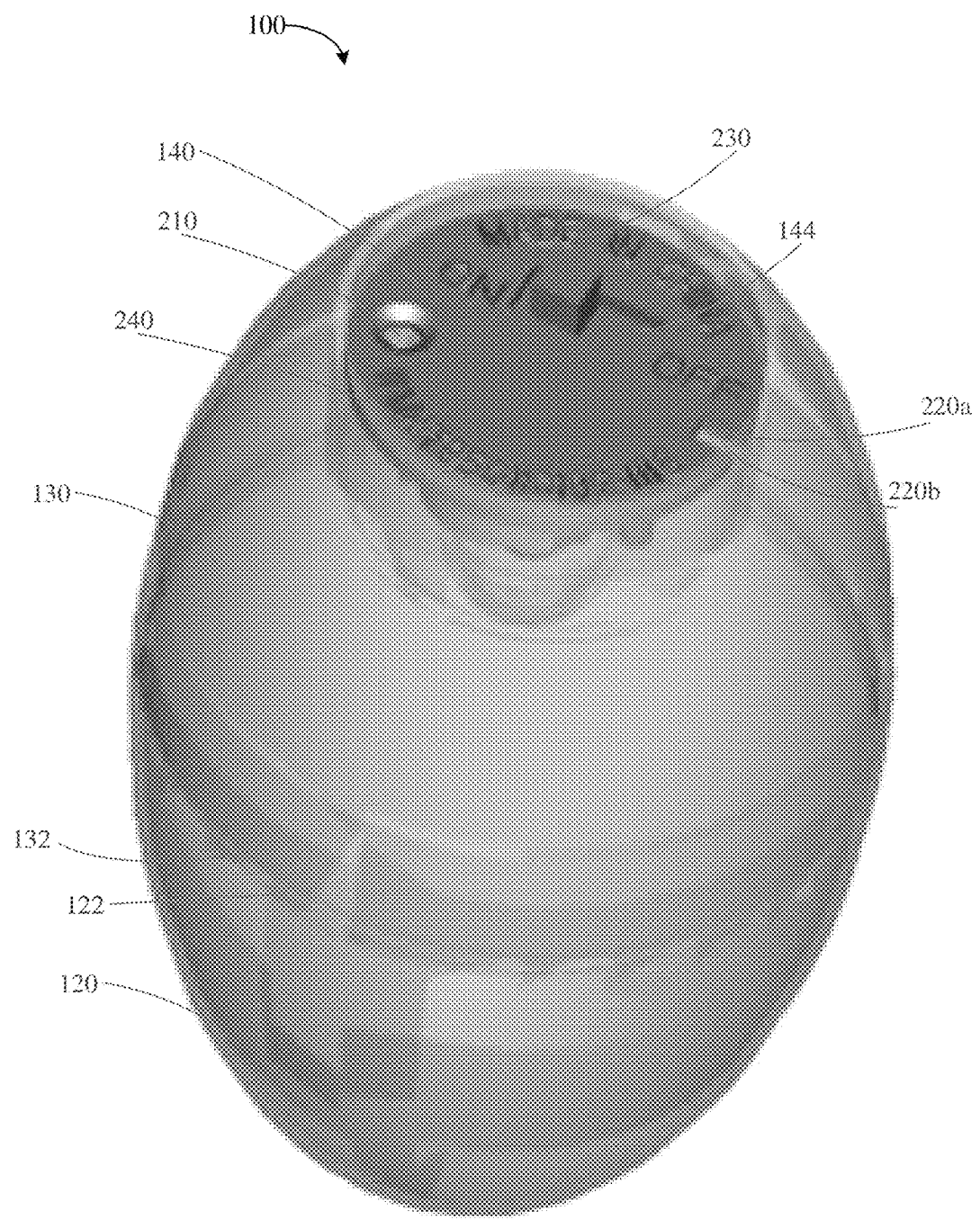
FIG. 3 of the drawings illustrates an isometric view of the egg-shaped device shown in FIG. 1 of the present disclosure.
Figure 4:
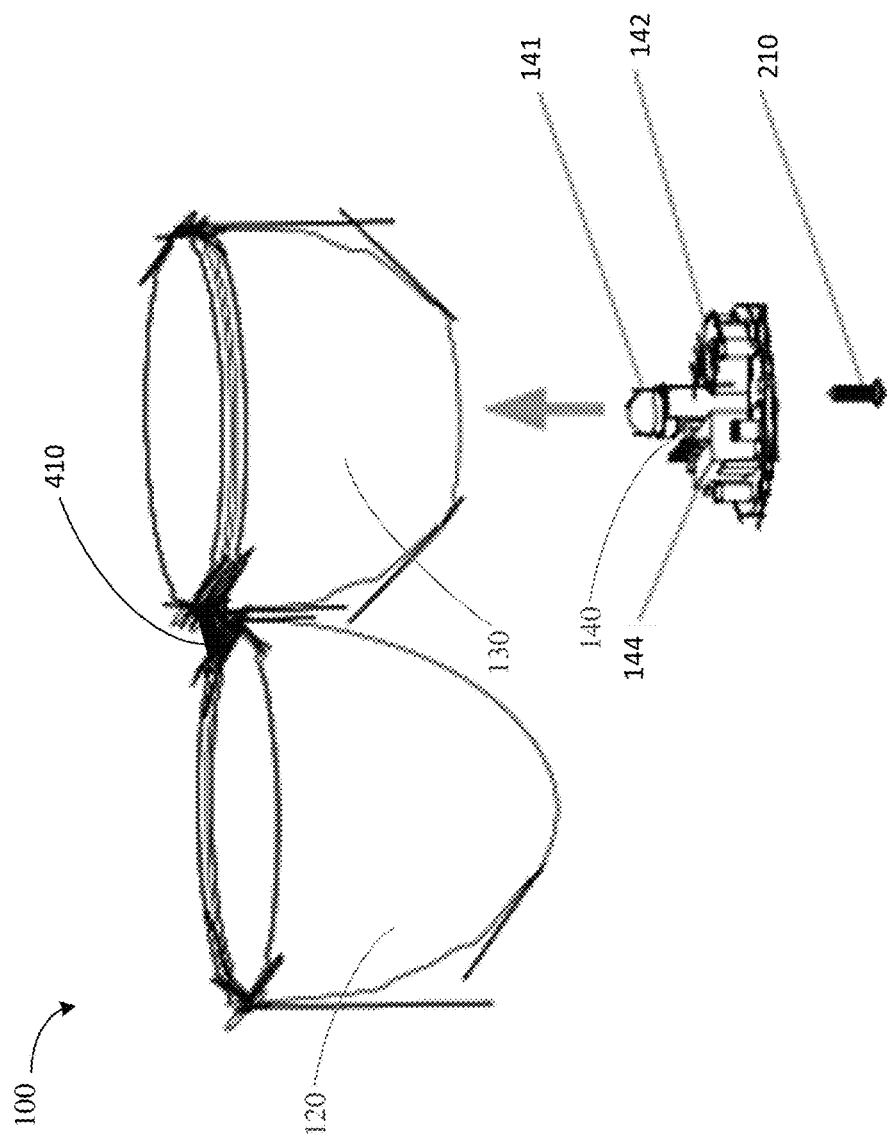
FIG. 4 of the drawings illustrates an exploded view of the egg-shaped device shown in FIG. 1 of the present disclosure.
Figure 5:
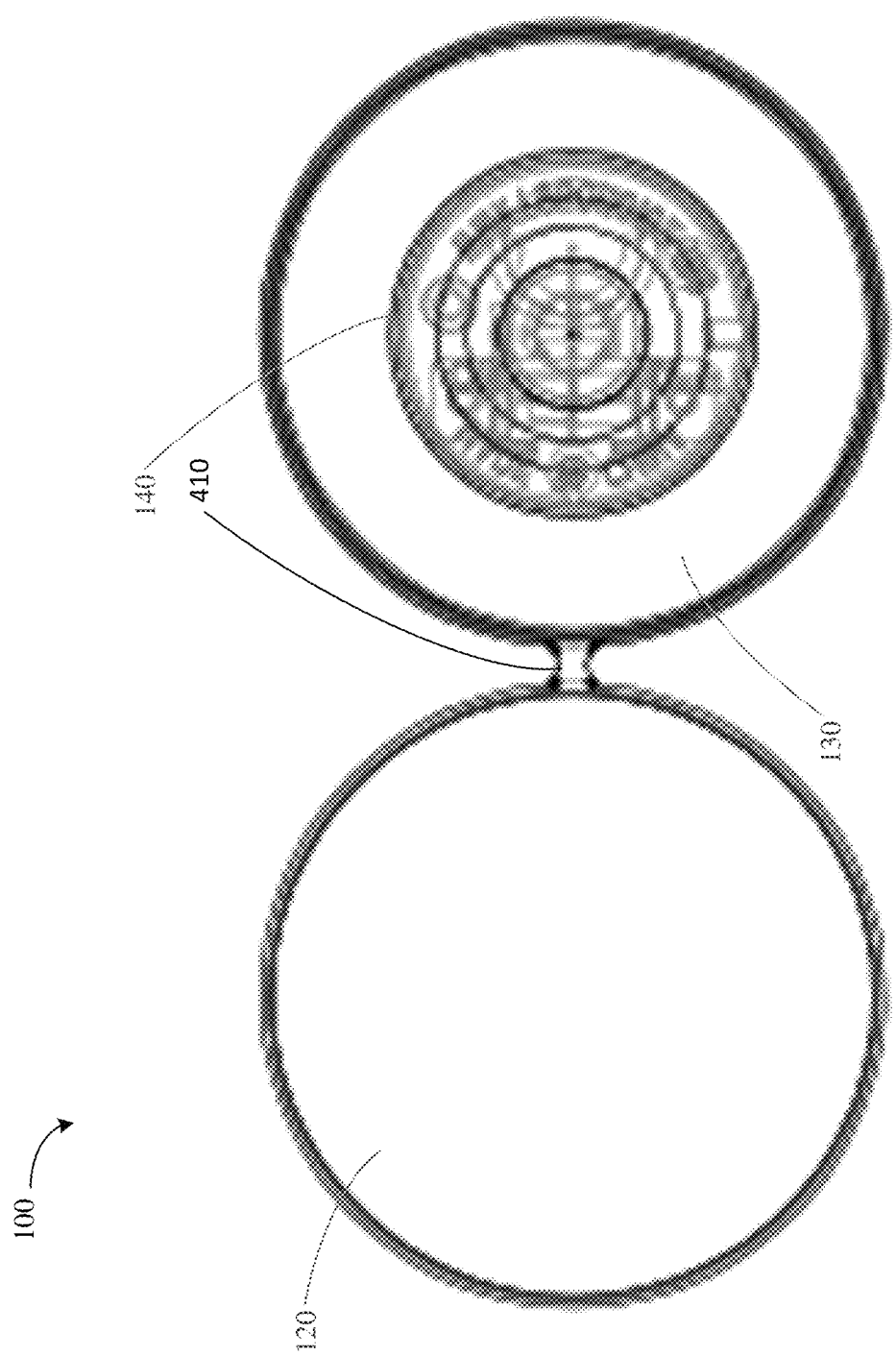
FIG. 5 of the drawings illustrates another bottom view of the egg-shaped device shown in FIG. 1 of the present disclosure.

While this disclosure is susceptible of embodiments in many different forms, there is shown in the drawings and described herein in detail a specific embodiment(s) with the understanding that the present disclosure is to be considered as an exemplification and is not intended to be limited to the embodiment(s) illustrated.

It will be understood that like or analogous elements and/or components, referred to herein, may be identified throughout the drawings by like reference characters. In addition, it will be understood that the drawings are merely schematic representations of the invention, and some of the components may have been distorted from actual scale for purposes of pictorial clarity.

Referring now to the drawings and in particular to FIG. 1, a device, such as an egg-shaped device 100, is disclosed that includes an egg-shaped housing 110 and a lighting module 140, with other various views of the device 100 also shown in FIGS. 2-5. The egg-shaped housing 110 has an inside surface 114 and an outside surface 112, with a thickness T being between the inside surface 114 and the outside surface 112. In at least one embodiment, the egg-shaped housing 100 is translucent such that at least some light from within the egg-shaped housing 110 is visible outside of the egg-shaped housing 110. In other embodiments, the egg-shaped housing is clear allow substantially all of the light from within the egg-shaped housing 110 is visible outside of the egg-shaped housing 110. The egg-shaped housing 110 can be constructed of plastic or another other material that allows at least some light from within the egg-shaped housing 110 to be visible outside of the egg-shaped housing 110. For example, the egg-shaped housing 110 can be constructed from at least one of Polyethylene Terephthalate (PET), High-Density Polyethylene (HDPE), Polyvinyl Chloride (PVC), Low-Density Polyethylene (LDPE), Polypropylene (PP), Polystyrene or Styrofoam (PS), polycarbonate, polylactide, acrylic, acrylonitrile butadiene, styrene, fiberglass, and nylon.

In at least one embodiment, the egg-shaped housing 110 includes a first portion 120 and a second portion 130. The first portion 120 and the second portion 130 are couplable together to form the egg-shaped housing 110. In an example, the first and second portions 120/130 are approximately equal such that the egg-shaped housing 110 is divided approximately in two by the first and second portions 120/130. The first and second portions 120/130 each include a snap fit 125/135, respectively, that prevent the first and second portions 120/130 from being easily separated, thereby securing an item 150, such as an Easter treat, within the egg-shaped housing 110. In at least one embodiment, a coupler 410 coupled to the first and second portions 120/130 is formed in conjunction with first and second portions 120/130. As shown, this coupler 410 is a small portion of plastic or another other material that the egg-shaped housing 110 is formed from and is disposed along the outside surface 112 of both the first and second portions 120/130. The coupler 410 is a flexible material that allows a movement between the first and second portions 120/130 while maintaining them in a coupled state. In the orientation shown in FIG. 1, the egg-shaped housing 110 has a width $W_e$, the first portion 120 has a height $H_f$, the second portion 130 has a height $H_s$, and the overall height of the egg-shaped housing is $H_e$. In an example, the device 100 is approximately sized as an actual grocery store refrigerated egg. In other example, the device is either larger or smaller than an actual grocery store refrigerated egg.

The lighting module 140 is coupled to the egg-shaped housing 110 and includes a light emitting diode 141, a battery 142 to power the light emitting diode 141, and a switch 144 to control whether power from the battery 142 is applied to the light emitting diode 141. The switch 144 can be any type of switch that controls application of power from the battery 142 to the light emitting diode 141, such as a slide switch shown, a push button switch, a wireless switch, etc. In at least one embodiment, the lighting module 140 further includes a receiver 143 (e.g., Bluetooth receiver, WIFI receiver, or any other wireless receiver) to receive control signals to control whether power from the battery 142 is applied to the light emitting diode 141 and the state of the light emitting diode 141, as will be explained in more detail below with respect to FIG. 7. The light emitting diode 141 generates light that shines on the inside surface 114 of the egg-shaped housing 110, the light being visible outside of the inside surface 114 of the egg-shaped housing 110, such as visible on the outside surface 112 of the egg-shaped housing 110. In at least one embodiment, the lighting module 140 is coupled to the egg-shaped housing 110 via a screw 210 that is inserted into a flat surface 145 of the lighting module 140. This flat surface 145 allows the egg-shaped housing 110 to stand up on a surface (e.g., floor, table, shelf, etc.) along a long axis 150 of the egg-shaped housing 110. In other embodiments, the lighting module 140 is coupled to the egg-shaped housing 110 via an adhesive.

In at least one embodiment, the lighting module 140 includes an alignment notch 220a that aligns with an alignment post 220b on the second end 118 of the egg-shaped housing 110, to properly align the lighting module 140 with the egg-shaped housing 110. In at least one embodiment, the egg-shaped housing 110 includes a first end 116, such as a top end depending upon the orientation of the eff shaped housing 110, and a second end 118 opposite an end of the egg-shaped housing 110 with respect to the first end 116. In at least one embodiment, the lighting module 140 is coupled to the egg-shaped housing 110 at one end of the egg-shaped housing, such as illustrated at the second end 118. In another embodiment, the lighting module 140 can be coupled to the egg-shaped housing 110 at the first end 116 or anywhere in between the first end 116 and the second end 118. The lighting module 140 has a height $H_l$ and a width $W_l$. The lighting module 140 can include identifying information on a visible surface thereof, for example a manufacturing country identifier 230 and/or a manufacturer part number 240.

In at least one embodiment, the lighting module 140 further includes a control circuit 143 (e.g., a microcontroller, a Resistor/Capacitor (RC) circuit, etc.) to control a state of the light emitting diode 141. In an example, the light emitting diode 141 is a multicolor light emitting diode. For example, the control circuit 143 controls a color of light produced by the light emitting diode 141, a periodic color change of the light emitting diode 141, a brightness of light produced by the light emitting diode 141, a periodic change between an ON and OFF state by the light emitting diode 141, a random color change of the light emitting diode 141, and/or any other characteristic(s) that are controllable for the light emitting diode 141.

Figure 6:
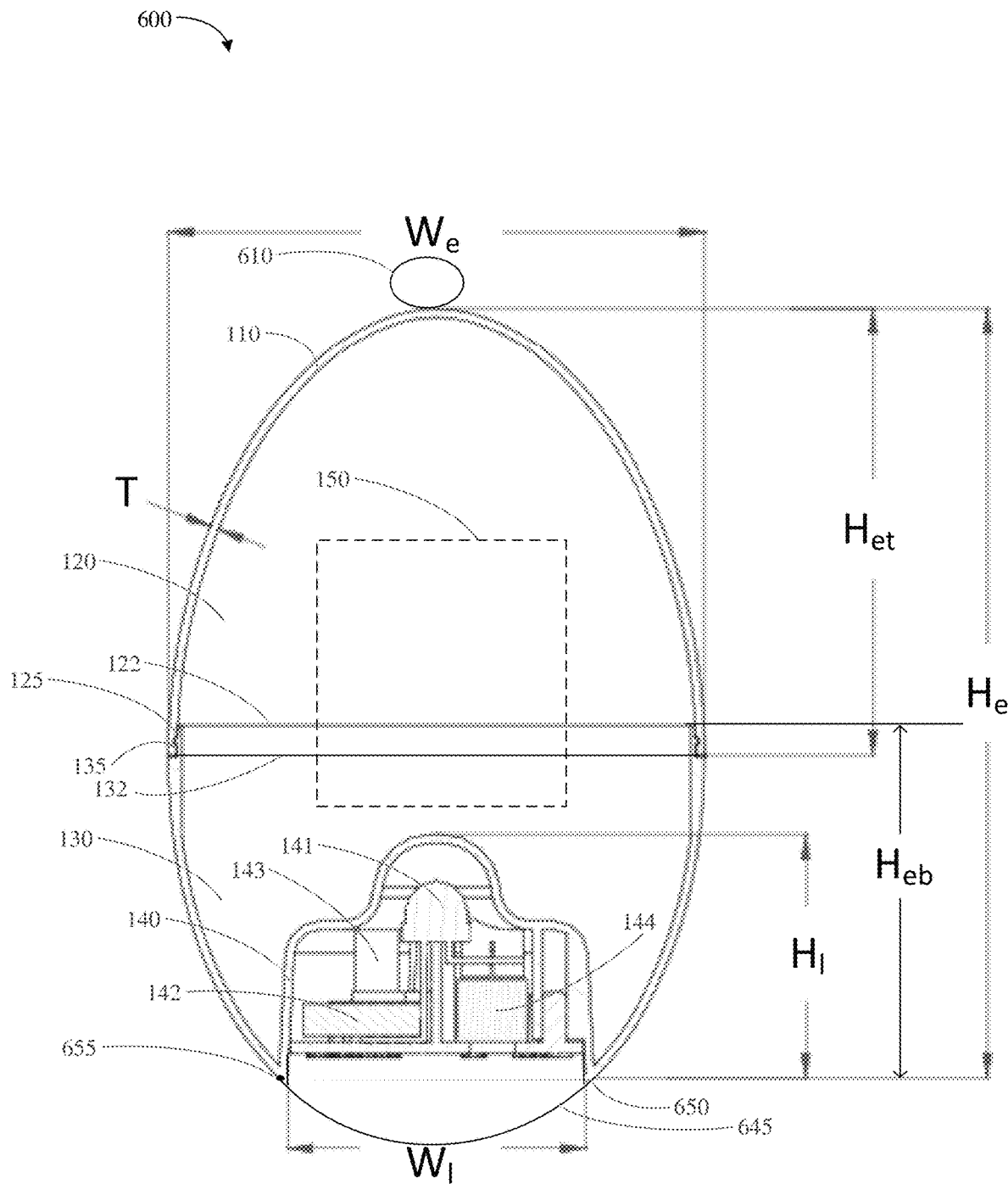
FIG. 6 of the drawings illustrates another example of an egg-shaped device of the present disclosure.

Referring now to FIG. 6, another device 600 includes option additional components that are not shown in FIGS. 1-5 for device 100. For example, in at least one embodiment, the device 600 can further include a hanger 610, coupled to the egg-shaped housing 110, to hang the device 600 from an object, such as a tree, nail, and/or another other object that a user desires to hang the device 100 from. The hanger 610 is shown as a loop through which a branch or other object can be inserted to hang the device 600. The device 600 also includes another optional component, a lighting module cover 645 to cover the lighting module 140. The lighting module cover 645 is shaped in an arc that together with the egg-shaped housing 110 forms a complete egg shape surrounding the lighting module 145, as shown. The device 600 further includes a coupler 655 to couple the lighting module cover 645 to the egg-shaped housing 110. This coupler 655 is similar to the coupler 410.

Figure 7:
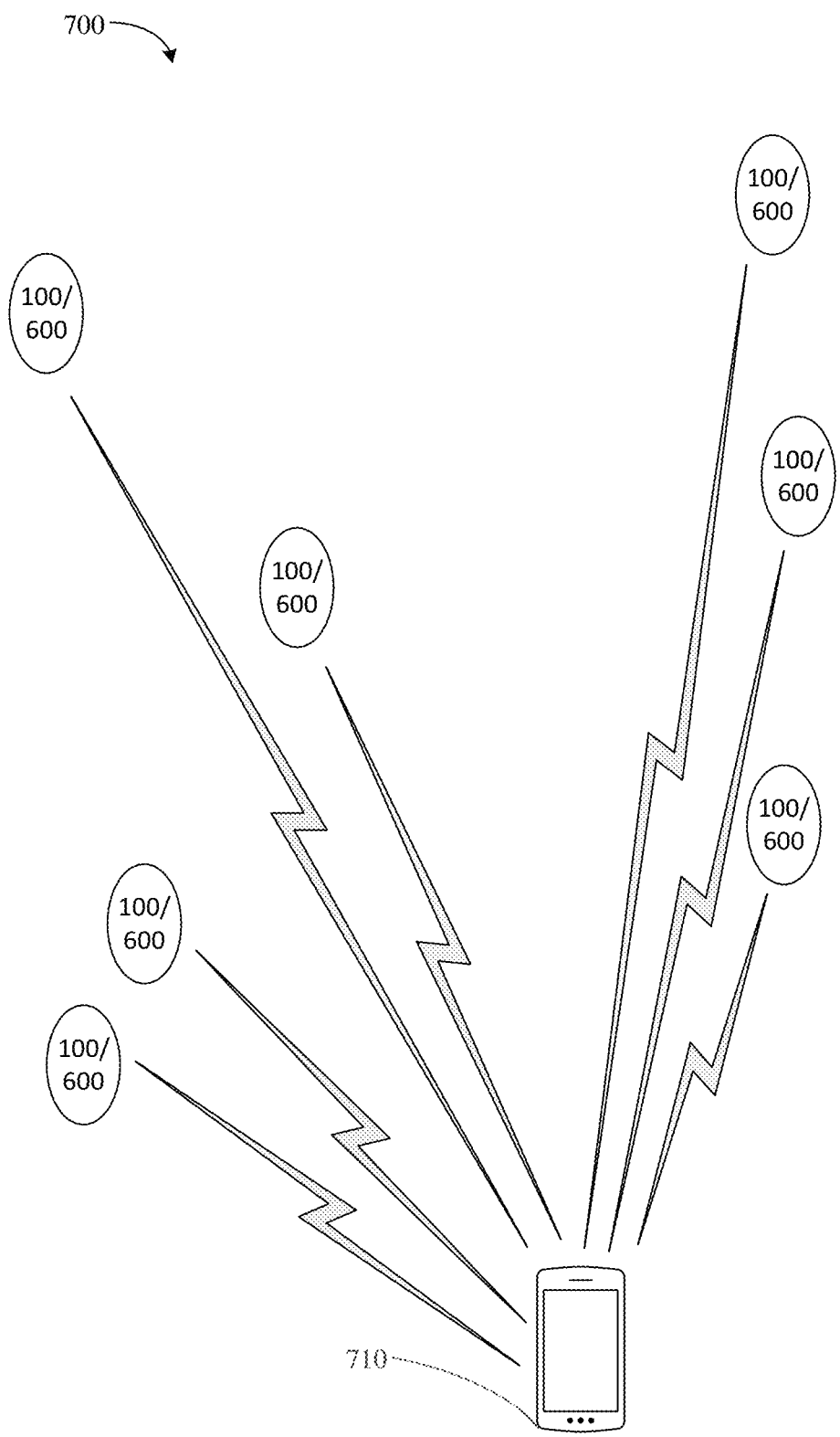
FIG. 7 illustrates a system that includes a plurality of remotely controlled egg-shaped devices shown in FIGS. 1-6 of the present disclosure

FIG. 7 illustrates a system 700 that includes a plurality of remotely controlled devices 100/600 shown in FIGS. 1-6. The system 700 further includes a remote control 710 that can control a state of the devices 100/600. The remote control 710, such as a cell phone, a tablet computer, a dedicated remote control, etc., transmits control commands to the devices 100/600 of the system 700 to control whether power is applied to the light emitting diodes 141 of the devices 100/600 and the state of the devices 100/600, respectively, such as any of the states described above. The remote control 710 can wirelessly connect with the devices 100/600 via Bluetooth, WIFI, or any other wireless protocol that allows for control commands to be sent from the remote control 710 and received by the devices 100/600.

The foregoing description merely explains and illustrates the disclosure and the disclosure is not limited thereto except insofar as the appended claims are so limited, as those skilled in the art who have the disclosure before them will be able to make modifications without departing from the scope of the disclosure.

What is claimed is:

1. A system including a plurality of Easter egg-shaped housings having light emitting diodes illuminating the Easter egg-shaped housings, with the plurality of Easter egg-shaped housings structurally configured for use in association with an Easter egg hunt, to, in turn, provide illumination thereto during the Easter egg hunt, the system comprising:
    a first Easter egg-shaped housing structurally configured to receive and releasably secure a first Easter treat therein during the Easter egg hunt, the first Easter egg-shaped housing comprised of a first inside surface and a first outside surface;
    a first lighting module fixedly coupled to a first distal end of the first Easter egg-shaped housing the first lighting module being inserted into a first recess formed into a first exterior of said first distal end, and comprising a first light emitting diode, a first battery to power the light emitting diode, and a first switch accessible by a user from outside of the first Easter egg-shaped housing and to control whether power from the first battery is applied to the first light emitting diode, the first light emitting diode generating light that shines on the first inside surface of the first Easter egg-shaped housing, the light being visible outside the first outside surface of the first Easter egg-shaped housing; and
    a second device comprised of a second Easter egg-shaped housing structurally configured to receive and releasably secure a second Easter treat therein during the Easter egg hunt and a second lighting module fixedly coupled to a second distal end of the second Easter egg-shaped housing, the second lighting module being inserted into a second recess formed into a second exterior of said second distal end, and comprised of a second light emitting diode, a second battery to power the second light emitting diode, and a second switch accessible by the user from outside of the second Easter egg-shaped housing, the second light emitting diode generating light that shines on a second inside surface of the second Easter egg-shaped housing, the light being visible on a second outside surface of the second Easter egg-shaped housing;
    wherein the first and second Easter egg-shaped housings are approximately sized as an actual grocery store refrigerated egg;
    wherein the first and second Easter egg-shaped housings each include a first portion and a second portion, the first portion and the second portion coupling together to form the first and second Easter egg-shaped housings and decoupling to accept the first and second Easter treats for the Easter egg hunt within the first and second Easter egg-shaped housings, respectively, while the first and second light emitting diodes provide illumination to the first and second Easter egg-shaped housings, respectively, to, in turn, provide additional visual indication during the Easter egg hunt.

2. The system according to claim 1, wherein the first and second Easter egg-shaped housings each further include a coupler to couple the first portion and the second portion.

3. The system according to claim 1, wherein the first and second lighting modules are each coupled to the first and second Easter egg-shaped housings via a screw.

4. The system according to claim 1, wherein the first and second Easter egg-shaped housings are each constructed from at least one of Polyethylene Terephthalate (PET), High-Density Polyethylene (HDPE), Polyvinyl Chloride (PVC), Low-Density Polyethylene (LDPE), Polypropylene (PP), Polystyrene or Styrofoam (PS), polycarbonate, polylactide, acrylic, acrylonitrile butadiene, styrene, fiberglass, and nylon.

5. The system according to claim 1, wherein the first and second switches are each a slide switch.

6. The system according to claim 1, wherein the first and second switches are each a wireless switch.

7. The system according to claim 1, wherein the first and second light emitting diodes are each a multicolor light emitting diode.

8. The system according to claim 1, wherein the first and second lighting modules are further comprised of first and second controllers, respectively, to control a state of the first and second light emitting diode, respectively.

9. The system according to claim 8, wherein the state of the first and second light emitting diodes includes a periodic color change of the first and second light emitting diode.

10. The system according to claim 8, wherein the state of the first and second light emitting diodes includes a random color change of the first and second light emitting diodes.

11. The system according to claim 8, wherein the state of the first and second light emitting diodes includes a periodic changed from an ON and OFF state of the first and second light emitting diodes.

12. The system according to claim 1, further comprising first and second hangers, coupled to the first and second Easter egg-shaped housing, respectively, to hang the first and second Easter egg-shaped housing from at least one object.

13. The system according to claim 1, wherein the first and second lighting modules each include a flat surface that allows the first and second Easter egg-shaped housings to stand up on a surface along a long axis of the first and second Easter egg-shaped housing.

14. The system according to claim 1, wherein the first and second Easter egg-shaped housings further include first and second lighting module covers to cover the first and second lighting module, respectively, the first and second lighting module covers shaped in an arc that together with the first and second Easter egg-shaped housings forms a complete egg shape surrounding the first and second lighting modules.

15. The system according to claim 14 further including first and second couplers to couple the first and second lighting module covers to the first and second Easter egg-shaped housings, respectively.

16. The system according to claim 1, wherein the plurality of Easter egg-shaped housings comprise at least six Easter egg-shaped housings, each having the configuration of at least one of the first Easter egg-shaped housing and the second Easter egg-shaped housing.

17. The system according to claim 1, wherein the first portion has a first height and the second portion has a second height, an overall height of the first and second Easter egg-shaped housings being formed by the first height and the second height.

18. The system according to claim 1, further comprising a remote control, having a non-egg-shaped housing, including a wireless transmitter to transmit a wireless control signal to the first and second switches to control, based on the wireless control signal, whether power from the first and second batteries is applied to the first and second light emitting diodes, respectively, in response to the wireless control signal.

19. The system according to claim 16, wherein the remote control is a dedicated remote control.

20. The system according to claim 1, wherein the first and second light emitting diodes protrude into the first and second Easter egg-shaped housings farther than the first and second batteries and the first and second switches, the protruding first and second light emitting diodes forming a recess between the first and first and second light emitting diodes and the first and second Easter egg-shaped housings, respectively.

* * * * *